(12) United States Patent
Smidt et al.

(10) Patent No.: US 8,350,170 B2
(45) Date of Patent: Jan. 8, 2013

(54) ELECTRIC HAND CONTROL, ESPECIALLY FOR ELECTRICALLY ADJUSTABLE HOSPITAL AND CARE BEDS

(75) Inventors: Verner Smidt, Broager (DK); Bjarne Carstensen, Augustenborg (DK)

(73) Assignee: Linak A/S, Nordborg (DK)

( * ) Notice: Subject to any disclaimer, the term of this patent is extended or adjusted under 35 U.S.C. 154(b) by 311 days.

(21) Appl. No.: 12/084,787

(22) PCT Filed: Nov. 10, 2006

(86) PCT No.: PCT/DK2006/000618
§ 371 (c)(1),
(2), (4) Date: May 9, 2008

(87) PCT Pub. No.: WO2007/054093
PCT Pub. Date: May 18, 2007

(65) Prior Publication Data
US 2010/0213042 A1    Aug. 26, 2010

(30) Foreign Application Priority Data
Nov. 11, 2005 (DK) .................................. 2005 01571

(51) Int. Cl.
*H01H 9/04* (2006.01)
(52) U.S. Cl. .................................................. 200/302.1
(58) Field of Classification Search .................. 200/5 A, 200/293, 294, 296, 297, 293.1, 302.1, 295
See application file for complete search history.

(56) References Cited

U.S. PATENT DOCUMENTS

| 3,030,479 | A | * | 4/1962 | Maximilian Ehrlich et al. ............................. 200/297 |
| 6,069,444 | A | * | 5/2000 | Krafcik et al. ................. 313/510 |
| 7,151,237 | B2 | * | 12/2006 | Mahoney et al. .............. 200/512 |
| 2007/0209916 | A1 | * | 9/2007 | Clegg et al. .................... 200/293 |

FOREIGN PATENT DOCUMENTS

| JP | 2004096548 | | 3/2004 |
| WO | 0072344 | | 11/2000 |
| WO | WO 2005036576 | A1 * | 4/2005 |

OTHER PUBLICATIONS

English Abstract of JP 2004096548.

* cited by examiner

*Primary Examiner* — Felix O Figueroa
(74) *Attorney, Agent, or Firm* — Dykeam Gossett PLLC

(57) ABSTRACT

An electric hand control, especially for electrically adjustable hospital and care beds and comprising a housing (1) constructed as a single trough shaped shell with a bottom and side walls, and wherein a printed circuit (2) with switches is mounted and above the switches there is a plate with tongue like shaped keys, and finally there is a cover foil (6) with indication of the keys and secured to the upper edge of the sides of the shell. As the housing is a single shell for one thing manufacturing of two difficult parts is avoided, for another assembling of these are avoided in the assembling process, and finally an assembling with a risk of leak is avoided. By further equipping the printed circuit and the cable with a plug (12*a*) the assembly is made easier. In this connection it is expedient that the spout (10) is equipped with an oval through going hole, so that the plug at the end of the cable can be led through the spout.

12 Claims, 3 Drawing Sheets

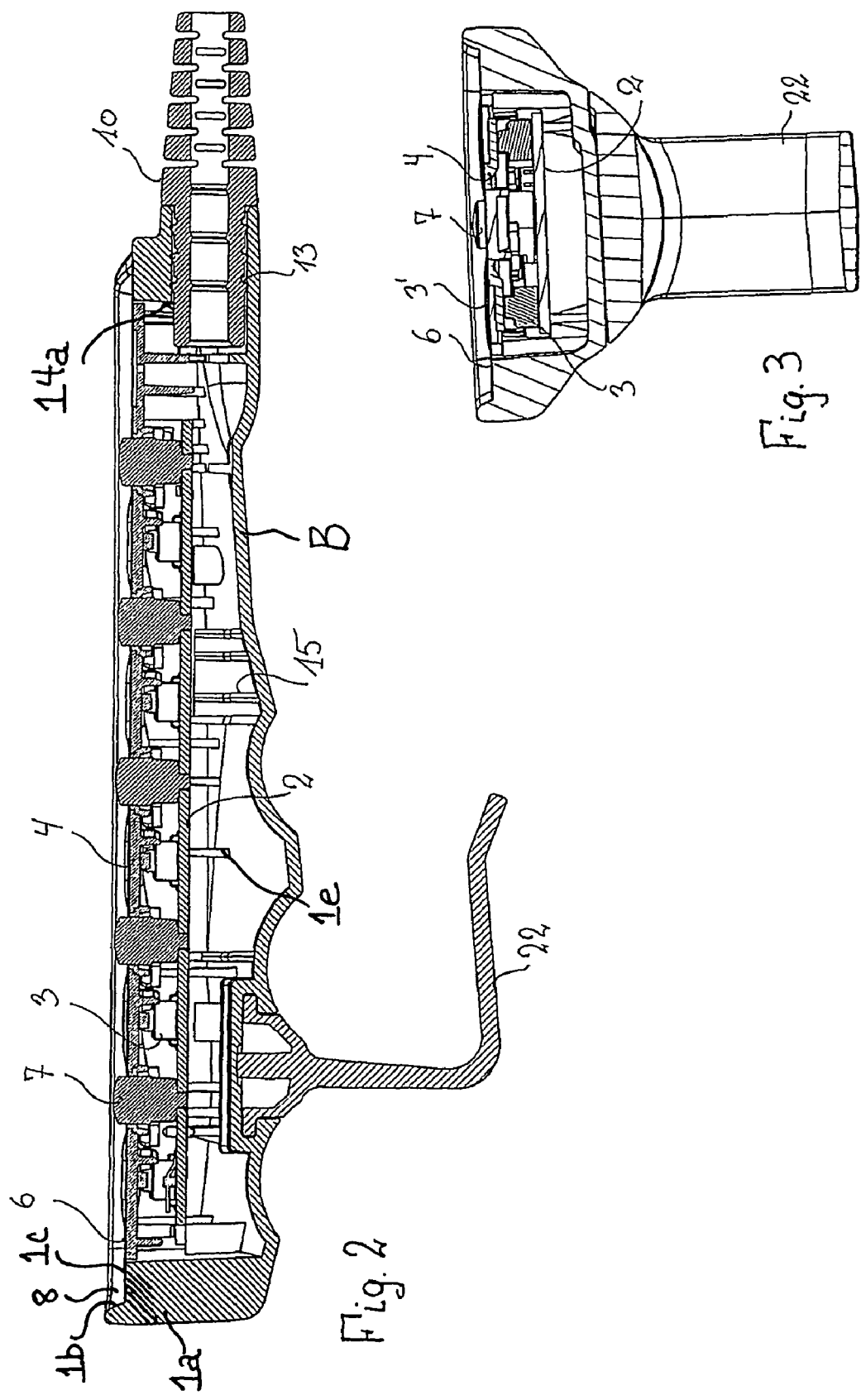

ELECTRIC HAND CONTROL, ESPECIALLY FOR ELECTRICALLY ADJUSTABLE HOSPITAL AND CARE BEDS

BACKGROUND OF THE INVENTION

1. Field of Invention

The present invention relates to an electric hand control especially for electrically adjustable hospital and care beds.

2. The Prior Art

Such hand controls are made of two plastic shells which combined constitute a closed housing. The assembly can be made with screws, by gluing or to ultrasound welding. Before the shells are joined, a printed circuit with switches and with a cable soldered onto it lead through a spout in the back of the hand control is inserted. In the upper plastic shell are keys, typically in the form of springy tongues, and a foil with graphics, localizing the keys and their function is mounted over the top side. By hospital and care beds it is demanded that the hand controls are humidity- and watertight, as they are washed and disinfected with the bed in washing tunnels designed especially for that purpose. In that respect it is rather difficult to make the joining of the two plastic shells properly watertight.

The object of the invention is to provide a hand control with a simplified structure, which allows for better sealing.

This is achieved according to the invention by constructing the hand control as just one shell, which means that the manufacturing of two parts and the joining of these during the assembly process is avoided, and a joining with the risk that it is not tight is avoided. The assembling is simply done by placing the parts in the shell and finally closing it with the cover foil.

By mounting the cover foil on a thread of a step down in the upper edge of the side wall of the shell, the edge of the cover foil is protected from unintended damage and at the same time the fastening is made easier as the edge in the step contributes to a unique and steady positioning of the cover foil. When the foil is mounted with an adhesive, a small surplus can be used, which collects in the crossing between the foil and the edge in the step or at least make sure that the adhesive reaches the edge. As already mentioned the hand control needs cleaning from time to time, for which purpose a distance of the side wall of the shell, preferably in one end of the hand control is lead on a level with the top side of the cover foil. This prevents accumulations of water on the top side of the hand control, just like dirt effectively can be wiped off through the opening. It is noted that the opening also contributes to an easier mounting of the cover foil.

The printed circuit and the plate with the keys can be fastened in various manners in the housing, but expediently the printed circuit is placed loosely on some support ribs while the plate is held in the housing with inter active snap lock connections. The use of screws, and particularly screws on the top side of the plate which can fret a hole in the cover foil, is thereby avoided. Altogether an even and smooth surface with a minimum of interruption is achieved, which ensures a good and lasting attachment of the cover foil.

A number of advantages are gained by constructing the plate with the keys made from a two component plastic material. So that the plate in a single process can be moulded with corresponding bricks, which constitutes the keys in a hard plastics, where the keys, preferably with strings, are connected to the surrounding part of the plate with a flexible plastic material. In embodiments of the hand control with locking function, i.e. where the switches with turn buttons are made inactive, the turn bottoms are sealed with the same two component plastic material by making the edge of the openings in the plate, wherein the turn buttons are placed, from the flexible plastic material, so that it forms a sealing against the turning knob. The two component material can also be used when securing the printed circuit and plate by equipping the plate with legs, which rests on the top side of the printed circuit with a foot for holding this. The foot is also made from the elastic plastic material, which for one thing has the advantage that the manufacturing tolerances are absorbed in the elastic feet and for another that the elasticity in the feet causes the previous mentioned snap lock connection to be held in secure mesh by the spring force. Finally it is advantageous to use a transparent plastic material for the plate when the hand control is equipped with background lighting. Thus light diodes can be mounted on the printed circuit and the light is distributed through the transparent plate and through selected completely or partially transparent areas of the cover foil, typically as markings for the keys.

Where cable connected hand controls are concerned, the cable is led through a hole in the housing, which provides basis for a good sealing. By making the hole in the housing with an oval cross section it will make the lead-in of the cable with plug easier and at the same time wider plugs can be used. Cuts in the top side of the side wall which can disturb the fastening of the cover foil and which can be difficult to seal is thereby avoided. The hole in the housing can be tube shaped, which is a good sealing surface and the spout on the cable can be equipped with sealing rings. As strain relief the spout can be equipped with a collar by the outer end, which when led into the housing rests against the inner side of the side wall of the housing. Logistically and in respect to the assembly it is an advantage to secure the cable to the printed circuit with a socket. Juggling with an unmanageable part like a printed circuit with a long cable soldered onto it in the assembly process is avoided. Logistically it is easy to make an individually adjustment of the cable length.

Further features of the invention will be explained more fully below in connection with an embodiment of the invention with reference to the accompanying drawings.

BRIEF DESCRIPTION OF THE DRAWINGS

FIG. 2 shows a longitudinal section through the hand control,

FIG. 3 shows a cross section through the hand control, and

DETAILED DESCRIPTION OF THE PREFERRED EMBODIMENT

Figure 1:
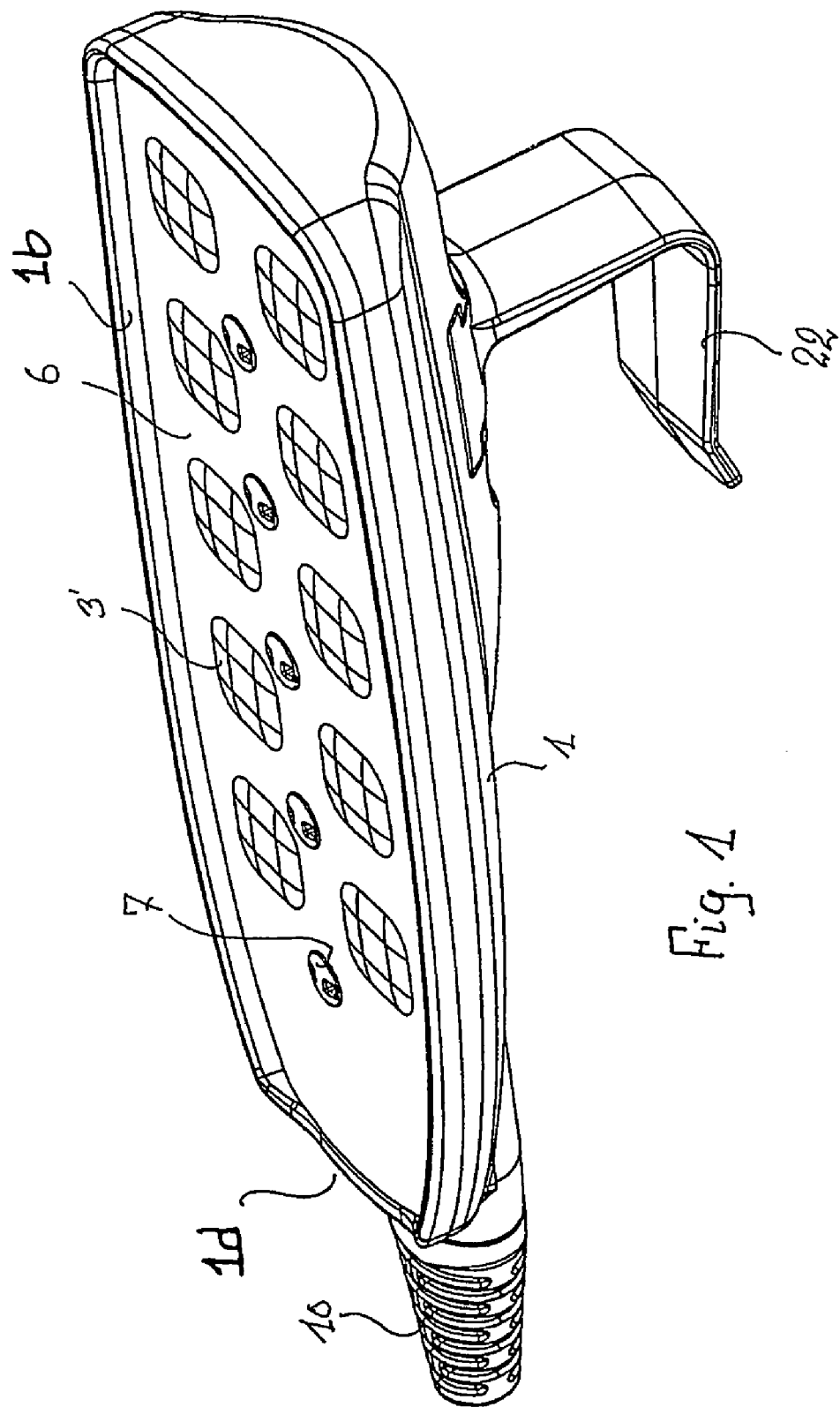
FIG. 1 shows a front perspective of the hand control seen from above.

The embodiment relates to a hand control for electrically adjustable care and hospital beds with actuators for raising and lowering a back and a leg rest and also raising and lowering the bed as a whole. For this purpose the hand control is equipped with keys placed in pairs, where one key brings about the raising and the other one the lowering.

The hand control comprises a trough-shaped plastic housing 1 having a bottom 8 and a side wall 1a, and wherein a printed circuit 2 with tactile switches 3 is mounted and above is a plate 4 with tongue like shaped keys 5. The top side of the housing is equipped with a cover foil 6 with graphics 3' localizing the keys and their function. As a special embodiment the hand control in question has a locking function for the switches 3, where the locking is done with turn knobs 7. The locking is done in that the turning knobs with two diametrically opposed legs activates an electric contact each, which cuts off the circuit for the two switches placed opposite each other.

When assembled the upper surface of the plate 4 is in line with a top surface 1c provided by a step down or recess 8 in the upper edge of the side wall 1a. The cover foil 6 is led over the plate 4 and to the top surface 1c and further to the upright edge 1b formed by the recess 8. The top surface 1c forms an inwardly-facing ledge. The cover foil is adhered, which notoriously has turned out to give a very good sealing against moisture and water splashes. In the rear of the housing the edge to the top side of the cover foil is removed over a distance for formation of a drain and drying opening 1d.

Figure 4:
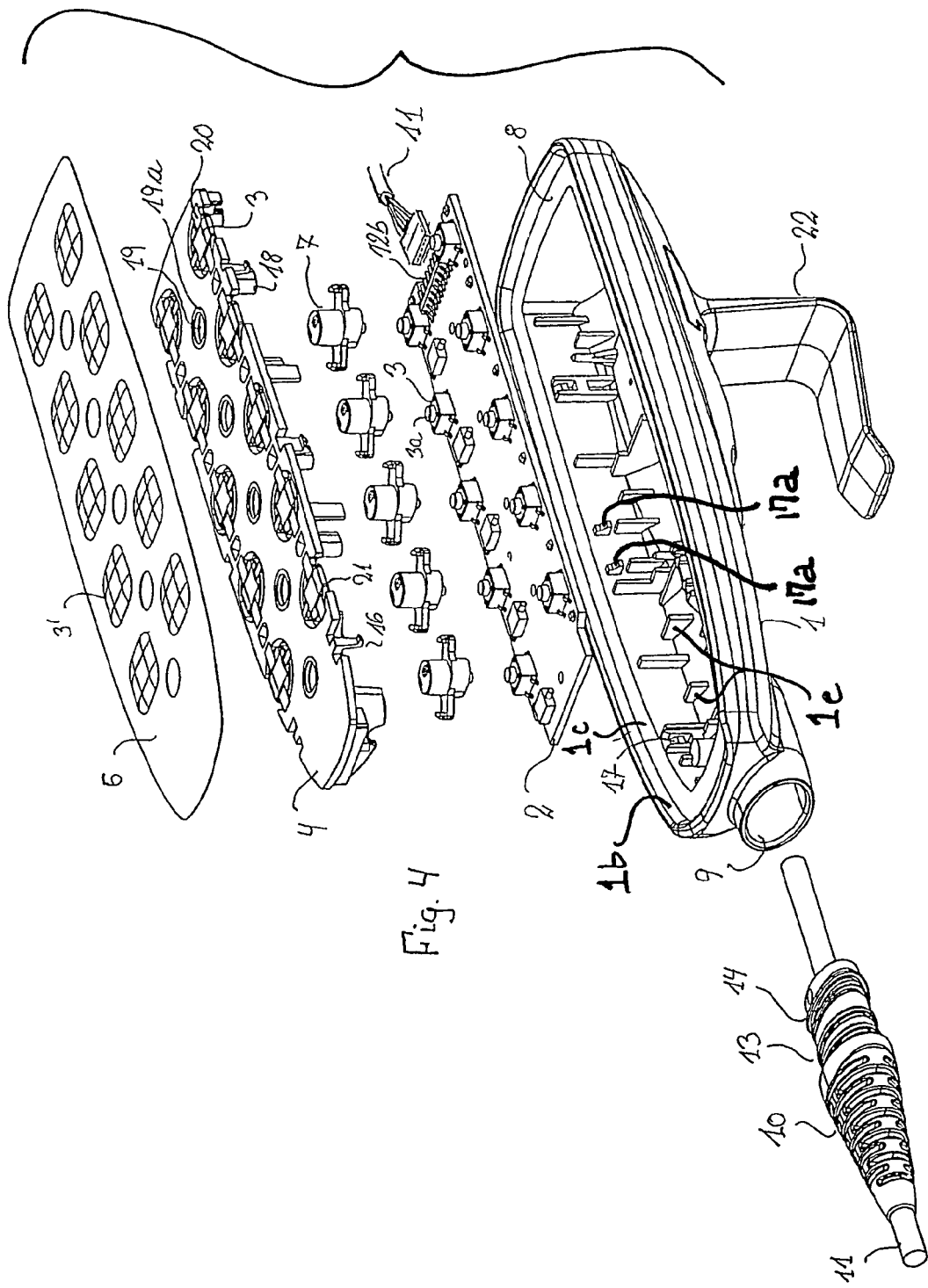
FIG. 4 shows an exploded view of the hand control.

Secured in an oval hole 9 in the rear of the housing 1 is a spout 10 on a wire 11, the wire being equipped with a flat male plug 12a which is received by a socket 12b on the print 2. On the spout is a lip sealing 13 for sealing against the inner wall in the oval hole 9. On the end of the spout is a collar 14 with a slanting edge towards the end of the collar to ease the lead-in into the hole. When the collar 14 is lead through the hole, it will with a surface 14a by a light tug at the spout away from the housing rest against the inner side of the side wall of the housing and in that way establish a first strain relief for the cable. The cable has a further strain relief almost in the middle of the housing in the form of a curved metal bushing pressed around the cable and which is received and held between a set of upright walls 15 in the bottom of the plastic shell. It should be noted that the cable is not shown in FIGS. 1-3 and only partially in FIG. 4. When assembled the cable runs under the printed circuit 2 and to the top end of this.

The plate 4 is made from a two component plastic material. The plate is mainly made from a rigid plastic material, while selected areas are made from a soft plastic material, as stated further in the following. The plate is secured in the housing 1 with snap lock legs 16, in intervention with projecting knots 17 inside the housing. The knots are made in connection with two strips, which serve as guide for the snap lock legs 16 and the knots have a slanting topside portion 17a to ease the lead-in of the snap lock legs 16. On the underside the plate has some pipe-shaped legs 18 of the softer flexible plastic material. These legs 18 support the print 2, which is placed loosely on a set of ribs 1e in the bottom of the housing. The legs are slightly deformed when the plate is put into place in the housing and thereby holds the print 2 and absorbs in addition production tolerances. The spring force, which by the deformation arises in these legs 18, will try to press the plate upwards, which presses the snap locks 16 into a secure mesh with the knots in the housing. The edge area 19a around the holes 19 for the turning knobs 7 is also made from the soft elastic plastic material and form a sealing against the periphery of the turning knobs. The keys 5 are mainly bricks, which with three bands 20 of the soft flexible plastic material is connected to the rest of the plate 4. Under the bricks is a pad 21, also made from the soft flexible plastic material. This pad 21 allows an after migration of the keys, when the activation key 3a on the tactile switches 3 is pressed down to its extreme. This gives a pleasant operation pressure and discourages a rough operation of the keys, which otherwise could cause these to be damaged. Furthermore, the plate 4 is made of a transparent two component plastic, so that if versions of the hand control with background lighting of the keys are wanted, it is possible to mount light diode on the printed circuit 3 just like that. The plate 4 works as light diffuser for uniform diffusion of the light under the cover foil 6. It is an obvious advantage that the plate can be moulded in one piece as a single object and can comprise the functions mentioned.

The hand control is assembled by leading the wire with flat male plug 12a through the spout 10 and securing this in the housing 1, laying the print 2 in and securing the flat male plug 12a to the socket 12b on the print. The plate 4 with the keys is also placed in the housing 1 over the print and finally the foil 6 is mounted. In the present embodiment the turning knob 7 must likewise be mounted to the locking function. Thus, the assembling of the hand control is fairly simple and an assembly line between the two shells is avoided.

A hanger 22 can be mounted on the back of the hand control by inserting the is hanger across from one side of the hand control into a guide way.

The invention claimed is:

1. An electric hand control which comprises:
   a trough-shaped housing which defines a bottom and a side wall having an upper edge, said upper edge having a step down which provides an upright edge and an inwardly-facing ledge defining a top surface,
   a printed circuit board supported in the housing, said printed circuit board including an electrical circuit and a plurality of switches,
   a plate mounted in the housing over the printed circuit board so that a upper surface thereof is generally level with said top surface of the side wall of said housing, said plate including a plurality of keys which are respectively aligned with said switches of said printed circuit board and
   interactive snap lock connection means for securing the plate in the housing, and
   a cover foil which extends over said plate and is sealingly attached at a periphery thereof to said top surface, wherein the upright edge is partially removed at one end of the hand control down to a level with a top side of the cover foil.

2. The electric hand control according to claim 1, including a plurality of elastic legs which extend toward and contact an upper surface of the printed circuit board to hold the printed circuit board in position within the housing.

3. The electric hand control according to claim 1, wherein the plate with the keys is made from a two component plastic material, where the keys are shaped like a brick of a hard plastic material and connected to a remainder of the plate with a band of an elastic plastic material, and the remainder of the plate is made from the same material as the keys.

4. The electric hand control according to claim 1, including turning knobs for locking the switches, said turning knobs extending through an opening in the cover foil and the plate, where an edge against the opening as well is made from an elastic plastic material to form a seal against the turning knob.

5. The electric hand control according to claim 1, wherein the plate comprises a transparent plastic material.

6. The electric hand control according to claim 1, including a cable extending through a hole in the housing and connected to the printed circuit board.

7. The electric hand control according to claim 6, wherein the cable is secured to the printed circuit board with a plug.

8. The electric hand control according to claim 7, wherein said hole has an oval cross section for introducing the cable with plug.

9. The electric hand control according to claim 6, wherein the cable is equipped with a spout, with sealing for resting against the inner side of the hole, and the spout as a strain relief further has a collar for resting against the inner side of the side wall in the housing.

10. The electric hand control according to claim 1, wherein the interactive snap lock connection means comprises snap lock legs attached to said plate and projecting knots extending inwardly from the side wall of said housing.

11. The electric hand control according to claim 10, including guide strips on each side of each knot which extend inwardly from the side wall of the housing, and wherein each knot includes a slanted topside portion to ease lead in of an associated snap lock leg.

12. The electric hand control according to claim 1, including a plurality of ribs in said housing on which said printed circuit board is positioned.

* * * * *